United States Patent [19]

Weetall

[11] Patent Number: 4,500,554
[45] Date of Patent: Feb. 19, 1985

[54] WINE STABILIZATION USING IMMOBILIZED TANNIC ACID

[75] Inventor: Howard H. Weetall, Big Flats, N.Y.

[73] Assignee: Corning Glass Works, Corning, N.Y.

[21] Appl. No.: 466,309

[22] Filed: Feb. 14, 1983

[51] Int. Cl.$^3$ ............................ A23L 3/36; C12H 1/04
[52] U.S. Cl. ................................ 426/323; 426/330.4; 426/422; 426/423
[58] Field of Search ...................... 426/330.4, 323, 422, 426/423; 528/230, 231

[56] References Cited

U.S. PATENT DOCUMENTS

| | | | |
|---|---|---|---|
| 2,224,815 | 12/1940 | Glycofrides | 528/232 |
| 4,027,046 | 5/1977 | Bohm et al. | 426/423 |
| 4,033,935 | 7/1977 | Blount | 528/230 |
| 4,090,919 | 5/1978 | Chibata et al. | 426/422 |
| 4,202,910 | 5/1980 | Bradley et al. | 210/767 |

OTHER PUBLICATIONS

I. Chibata et al., Applications of Immobilized Tannin for Protein and Metal Adsorption, pp. 259–264.

Primary Examiner—Robert Yoncoskie
Assistant Examiner—Elizabeth C. Weimar
Attorney, Agent, or Firm—B. D. Voyce

[57] ABSTRACT

A process for stabilizing wine is characterized by:
(a) copolymerizing formaldehyde and tannic acid attached to an insoluble carrier to form an immobilized tannic acid composite
(b) contacting a wine having components which cause haze formation upon heating with the immobilized tannic acid for a period sufficient to remove the desired amount of haze components; and
(c) separating the treated wine from the immobilized tannic acid.

2 Claims, No Drawings

WINE STABILIZATION USING IMMOBILIZED TANNIC ACID

TECHNICAL FIELD

The present invention relates to a method and apparatus for stabilizing wine. More particularly, it discloses a novel means for removing compounds which can cause haze formation in wine exposed to higher than ambient storage temperatures. Immobilized tannic acid is used.

BACKGROUND ART

During the handling and bulk shipping of wine, it can be exposed to higher than ambient storage temperatures, such as during truck shipment during the hot summer months. While the wine may stay clear during wine cellar storage, the warmer temperatures can cause hazing problems. In the past this problem was addressed by bentonite treatments known to the art.

Immobilized gallotannins have been reported in the prior art. In an article presented at the Sixth Enzyme Engineering Conference in Japan, 1981, titled "Applications of Immobilized Tannin for Protein and Metal Adsorption", the authors described how immobilized chinese gallotannin reduced the turbidity which results from pasteurizing beer (sake).

Sake, produced from fermented rice, was pasteurized at 65° C. for 15 minutes, whereupon it became turbid. It was then passed through a column packed with immobilized gallotannin. Sake treated in this way was said to not change in turbidity during storage. The disclosed adsorbent was said to hold promise for improving sake, beer, wine and juice by removing undesirable protein constituents.

DISCLOSURE OF THE INVENTION

In accordance with the present invention, an apparatus/process is disclosed for stabilizing wine by using immobilized tannic acid. Wine having components which cause haze formation when heated at above ambient storage temperatures are contacted with immobilized tannic acid for a time sufficient to remove the desired amount of haze components. After this treatment, wine separated from the immobilized tannic acid is stable, even when subjected to heat for a long time.

The present invention solves a problem not easily addressed in the prior art, namely, the destabilization of wine, especially white wine, under long term, slightly elevated temperatures. This is to be distinguished from other forms of turbidity problems or hazing. Cloudiness due either to chilling (chill haze) or to short periods of excessive heat (pasteurization haze) is not the same as that which occurs as a result of the destabilization of wine over the long term.

It should be noted that tannic acid can be immobilized to many known carriers by various methods known to those of skill in the art. An exhaustive recitation of these methods and carriers is not necessary.

BEST MODE FOR CARRYING OUT THE INVENTION

The following examples further illustrate preferred modes of stabilizing wines by the present disclosure.

A haze formation test was used to determine whether wine has been stabilized. A 5.0 ml sample of wine was warmed to 45° C. for 120 minutes. The sample was then checked for haze formation spectrophotometrically at 550 nm.

EXAMPLE 1

Immobilized Tannic Acid

A white wine supplied by a California vintner not previously stabilized by bentonite treatment was passed through a 30 g column at a flow rate of 133 ml/hr. Samples were collected over time and subjected to stabilization testing.

The wind was flowed over a column of immobilized tannic acid. By methods known to one of skill in the art, tannic acid was attached to a $SiO_2$ carrier (40/80 mesh, 380 Å average pore diameter) by periodate oxidation.

| | | Results | | |
|---|---|---|---|---|
| | | $\Delta A_{550}$ nm vs. $H_2O$ | | |
| Sample | Initial Visible | Overnight 4° C. | Heated 2 hrs. @ 45° C. | Final Visible |
| Untreated Wine | Cloudy | 0.093 | 0.264 | Cloudy |
| Centrifuged Wine | Clear | 0.030 | 0.164 | Cloudy |
| Celite Filtered | Clear | 0.032 | 0.129 | Cloudy |
| Tannic Acid Treated | Clear | 0.028 | 0.034 | Clear |
| Tannic Acid Treated | Clear | 0.023 | 0.031 | Clear |
| After passing 2000 ml through the column a sample was again evaluated as follows: | | | | |
| Tannic Acid Treated (late) | Clear | 0.023 | 0.104 | Sl. Cloudy |

EXAMPLE 2

Carrier Control

A 30 g column of $SiO_2$ coupled to gamma-aminopropyltriethyoxysilane was prepared and operated in a manner identical to the column in Example 1. Unstabilized white wine was heated at 45° C. for 120 minutes, then flowed through the control column. The result was:

| Sample | Initial Visible | $\Delta A_{550\ nm}$ | Final Visible |
|---|---|---|---|
| Untreated Wine | Clear | 0.178+ | Cloudy |

The $SiO_2$ alkylamine acted in a fashion identical to centrifugation and celite filtration. Unlike tannic acid treatment the haze causing components were not removed completely.

EXAMPLE 3

Tannic Acid Coupled, Phenol-Formaldehyde Resin

A phenol-formaldehyde amine functional resin column was run. However, the resin was reacted with periodate oxidized tannic acid as previously described. A 2×30 cm column was used and the wine flow rate through the column was 60 ml/hr.

The results were:

| | $\Delta A_{550\ nm}$ (45° C. Assay Overnight) | |
|---|---|---|
| Total Vol Passed (ml) | Resin | Control |
| 950 | 0.07 | 0.25 |
| 2250 | 0.06 | 0.21 |
| 3020 | 0.08 | 0.27 |
| 5895 | 0.05 | 0.26 |
| 6725 | 0.04 | — |
| 7605 | 0.09 | — |

| Total Vol Passed (ml) | $\Delta A_{550 nm}$ (45° C. Assay Overnight) | |
|---|---|---|
| | Resin | Control |
| 10185 | 0.10 | 0.30 |
| 12765 | 0.09 | — |

These results were similar to that of Example 1.

EXAMPLE 4

Tannic Acid—Formaldehyde Derivative

To 100 g $SiO_2$ carrier was added 34 g tannic acid plus 250 ml water. The pH was adjusted to 10.8 with NaOH solution. To this was added 29.2 ml of formaldehyde solution (37% solution). This was heated at 70° C. for 2 hours, brought to pH 6.7 with $H_2SO_4$, washed once with $H_2O$ (one volume), placed in a 70° C. oven and dried overnight.

The product was washed with water for 3 days on a fluidized bed using tap water. This was followed by washing in 0.01N HCl until the solution was clear.

The product, which is a formaldehyde-tannic acid copolymer, was tested for wine stabilization in a 1.5×30 cm column at flow rate of 60 ml/hr.

| Results | 55° C. Overnight |
|---|---|
| Control Sample | 0.51 |
| 2 hours | 0.04 |
| 6 hours | 0.07 |

Results show stabilization of the wine occurs.

Having described the invention with particular reference to preferred form, it will be obvious to those skilled in the art to which the invention pertain, that, after understanding the invention, various changes and modifications may be made without departing from the spirit and scope of the invention as defined by the appended claims.

I claim:

1. A process for stabilizing wine comprises:
   (a) copolymerizing formaldehyde and tannic acid attached to an insoluble carrier to form an immobilized tannic acid composite;
   (b) contacting a wine, having components which cause haze formation upon heating, with the immobilized tannic acid for a period sufficient to remove the desired amount of haze components; and
   (c) separating the treated wine from the immobilized tannic acid composite.

2. The process recited in claim 1 wherein the carrier is silicon dioxide.

* * * * *